UNITED STATES PATENT OFFICE.

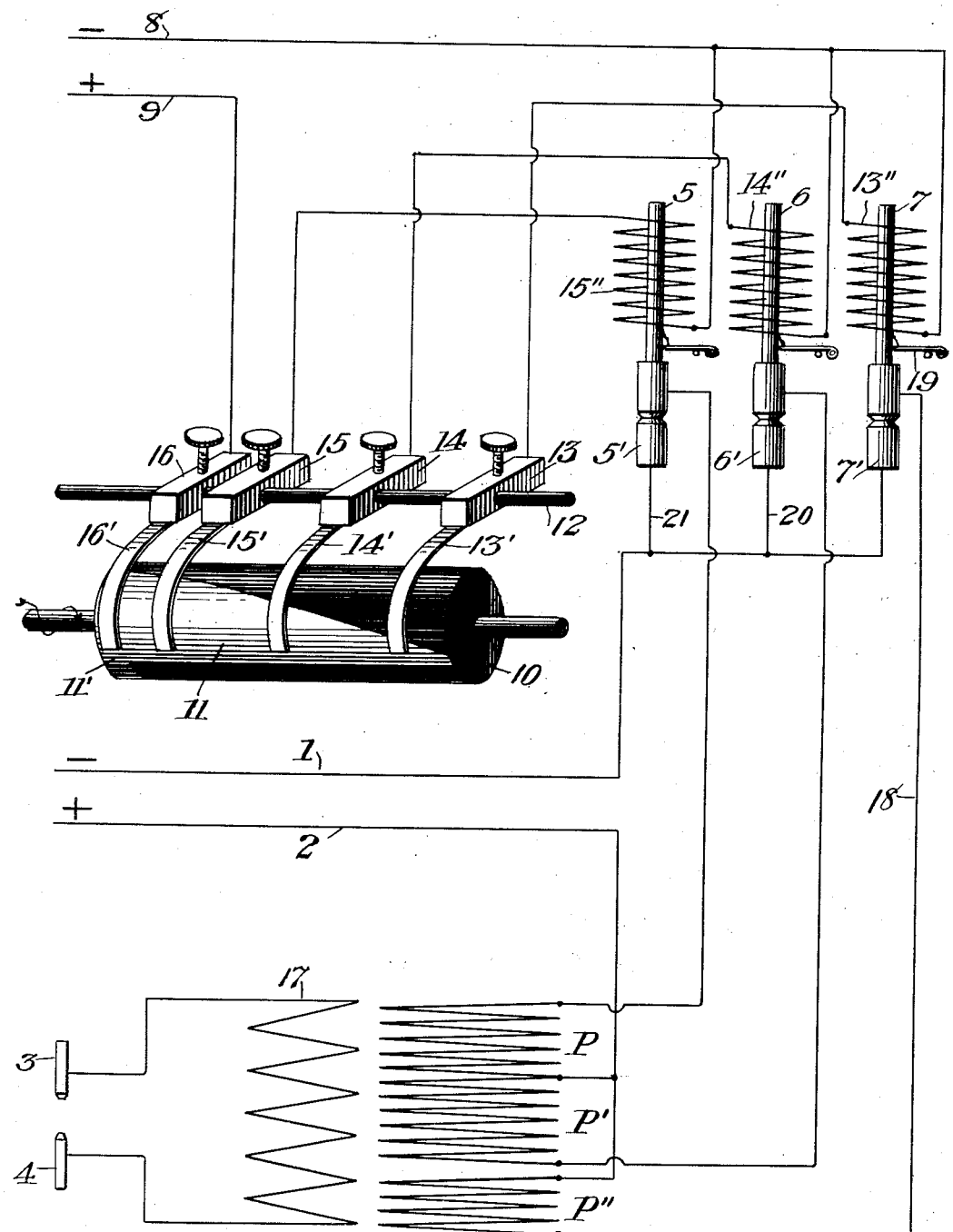

JOHN ALLEN HEANY, OF NEW YORK, N. Y., ASSIGNOR TO ROYALTY COMPANY, OF CHICAGO, ILLINOIS, A CORPORATION OF ILLINOIS.

TIMING MECHANISM FOR ELECTRIC WELDING.

1,207,915.  Specification of Letters Patent.  Patented Dec. 12, 1916.

Application filed September 20, 1916. Serial No. 121,244.

*To all whom it may concern:*

Be it known that I, JOHN ALLEN HEANY, a citizen of the United States, residing in the city of New York, county of New York, and State of New York, have invented certain new and useful Improvements in Timing Mechanism for Electric Welding; and I do hereby declare the following to be a full, clear, and exact description of the invention, such as will enable others skilled in the art to which it appertains to make and use the same.

This invention relates to a timing mechanism for electric welding machines and has for its object to provide a simple and efficient apparatus whereby the period of current flow to the electrodes may be accurately regulated and varied.

A further object of the invention resides in the provision of a timing mechanism which may be used in both spot and butt welding and which may be accurately and easily adjusted to meet the various conditions of each of said operations.

It is, of course, understood that in butt welding, the temperature of the two ends which are to be welded together is preferably raised slowly to that of a red heat. After this preliminary rise of temperature, the temperature is increased to a welding heat as the two are pressed together. The present invention contemplates the successive raising of the temperature by variation in the current flow, which variation is automatically accomplished, and it further contemplates the variation of the periods of current flow to meet various conditions. For instance, under certain conditions it might be preferable to carry out the preliminary heating of the metal for a period of one minute, then the secondary heating for a period of two minutes, and the final heating to the welding temperature for a period of one-half minute. However, under other conditions, it may be found advisable to vary any or all of these periods, and the invention includes means for accomplising such variations.

In the drawings, the figure illustrates the invention diagrammatically.

The embodiment of the invention illustrated in the drawing includes a timer which consists of a commutator 10, which is composed of insulating material and in which a contact plate 11 is inlaid. This plate has on one end, a circular portion 11′ which extends completely around one end of the commutator. The other portion of the plate extends throughout the entire length of the commutator and one edge thereof is parallel to the axis thereof, while the other edge passes in a helical path about the same. Thus the width of the plate is gradually decreased from the circular portion 11′ to the remote end of the commutator. The commutator is driven by any well-known variable speed transmission (not shown), so that it will rotate in such direction that the straight edge of the plate 11 will lead in the movement and will be followed by the helical edge. A suitable bar 12 of insulating material is mounted parallel to the axis of the commutator and carries at one end, a brush-holder 16 on which is mounted a brush 16′. This brush 16′ wipes the circular portion 11′ of the plate 11 continuously during the rotation of the commutator. A plurality of brush-holders 13, 14 and 15 are adjustably mounted on the bar 12 and carry suitable brushes 13′, 14′ and 15′, which alternately wipe the plate 11 and the insulating portion of the commutator. While I have illustrated and described a definite number of these brushes, it is to be understood that the number may be varied at will, as it is desirable to vary the changes of temperature of the material being welded. These brush-holders may be moved longitudinally of the bar 12 and independently of each other, so that when the commutator rotates at a predetermined and constant speed, the brushes may be adjusted along the same to vary the time of the current flow by varying the time of the engagement between the plate 11 and the brushes.

A direct current is conducted to the brush 16′ through a wire 9, and thence passes through the plate 11′ to all of the remaining brushes when they are all in contact with the plate, or to such of the brushes as are in contact with the plate. From these brushes, the current follows any or all of a plurality of wires to suitable magnets, 13″, 14″ and 15″, which are connected to a suitable return wire 8. A transformer which includes a secondary winding 17, the terminals of which are connected to the welding electrodes 3 and 4, is provided. The primary winding of this transformer includes three separate parts P, P′, P″, which are connected to a suitable source, in the following manner, so that the current may flow through any or all of the parts. A current supply wire 2 is connected to one terminal of the part P″, while a wire 18 extends from the other terminal of the same to a movable contact 7, which is normally held away from a stationary contact 7′ by a suitable spring 19, but which is forced into engagement with the stationary contact upon the energizing of the magnet 13″. A return wire 1 extends from the stationary contact 7′ to the source. One terminal of the part P′ of the primary of the transformer is connected to the wire 2, while the other extends to a movable contact 6 similar to the contact 7 and held normally out of engagement with a stationary contact 6′ by a similar spring. A wire 20 connects this stationary contact 6′ to the wire 1. One terminal of the part P of the primary of the transformer is connected to the wire 2, while the other terminal is connected to a suitable wire which extends to a movable contact 5 similar to the contacts 6 and 7 and operated by the magnet 15″ to move in one direction, and by a spring similar to the spring 19 to move in the other direction. This contact 5 is arranged to engage a stationary contact 5′ which is connected to the wire 1 by a suitable wire 21. Thus when the contacts 5, 6 and 7 engage the stationary contacts 5′, 6′ and 7′, that is to say, when the magnets 13′, 14′ and 15′ are active to cause such engagement, the circuit is closed through all of the parts of the primary winding, and consequently, a predetermined current will flow from the electrodes 3 and 4. It is, of course, to be understood that the magnets, together with the circuits which they are operative to close and together with the number of parts of the primary of the transformer, may be varied to meet the varying conditions, as the number of the aforementioned brushes is varied.

Assuming that the operation of butt welding is being carried out with the apparatus as illustrated, all of the electro-magnets will be energized initially, as the brushes will be in contact with the plate 11 of the commutator. This being true, the circuits in which all of the parts of the primary of the transformer are included will be closed and the current will flow through the entire primary winding. When, however, the commutator rotates a predetermined distance and for a predetermined length of time, the brush 13′ will move from the plate 11, and thus break the circuit through the magnet 13″, and the spring 19 will operate to break the circuit through the part P″ of the primary winding, so that during the subsequent operation of the apparatus, the current will flow through a lesser number of turns in the primary winding, and consequently, the voltage at the electrodes 3 and 4 will be increased. The remainder of the brushes operate successively during the rotation of the commutator to cut out the remaining parts of the primary winding until the circuit through the winding is entirely broken, at which time the welding operation will have been completed.

It will thus readily be seen that during the welding operation, the temperature may be regulated, and that as the operation proceeds step by step, the temperature will be varied to predetermined extents. Furthermore, as the conditions require, the period of duration of the flow of the current and the consequent change of temperature may be varied.

What I claim is:—

1. In a timing device for electric welding machines, means for effecting variations in the voltage during the welding operation and for effecting variations of the time of flow of the current during each voltage variation.

2. In a timing device for electric welding machines, a transformer having welding electrodes connected to the secondary winding thereof and having its primary winding formed in a plurality of parts, means for conducting an electric current to said parts, and means for automatically and successively rendering said parts inactive.

3. In a timing device for electric welding machines, a transformer having a primary winding formed of a plurality of parts and having a constant secondary winding, means operable to close the circuits through the parts of the primary winding, simultaneously, and for permitting them to be successively opened, and means for regulating the time of flow of the current through each part.

4. In a timing device for electric welding machines, a transformer having its primary winding consisting of a plurality of parts, means for rendering said parts active, and means for rendering said last-mentioned means successively inoperative including a plurality of controlling magnets, a commutator having a contact plate thereon and brushes connected to the magnets and to a suitable source and arranged to successively pass out of contact with said plate, said brushes being independently adjustable to vary the time of contact.

5. In a timing device for electric welding machines, means for varying the voltage and the time interval between successive voltage variations.

6. In a timing device for electric welding machines, means for varying the voltage and the time interval between successive voltage variations, and means for varying the time of flow of the current during each voltage variation.

7. In a timing device for electric welding machines, means for varying the voltage in predetermined amounts and for predetermined times.

In testimony whereof I affix my signature.
JOHN ALLEN HEANY.